(12) United States Patent
Deville

(10) Patent No.: US 6,594,909 B2
(45) Date of Patent: Jul. 22, 2003

(54) CUTTING TOOL OR THE LIKE, SUCH AS A PAIR OF SECATEURS COMPRISING TOW PIVOTING ACTIVE MEMBERS

(75) Inventor: Antoine Deville, Vieil-Baugé (FR)

(73) Assignee: Deville S.A. (FR)

( * ) Notice: Subject to any disclaimer, the term of this patent is extended or adjusted under 35 U.S.C. 154(b) by 26 days.

(21) Appl. No.: 10/058,641

(22) Filed: Jan. 29, 2002

(65) Prior Publication Data

US 2003/0101596 A1 Jun. 5, 2003

(30) Foreign Application Priority Data

Nov. 30, 2001 (FR) .............................. 01 15545

(51) Int. Cl.[7] .............................................. B26B 13/12
(52) U.S. Cl. ............................. 30/341; 30/340; 30/342
(58) Field of Search ......................... 30/340, 341, 342, 30/344, 329; 81/427.5, 177.1; 294/16; 16/430

(56) References Cited

U.S. PATENT DOCUMENTS

| 2,941,294 | A | * | 6/1960 | Vosbikian et al. | ............. | 30/340 |
| 4,565,004 | A | * | 1/1986 | Heinz | ............. | 30/342 |
| 5,210,925 | A | * | 5/1993 | Morgulis | ............. | 30/340 |
| 5,299,475 | A | * | 4/1994 | Stroop | ............. | 16/430 |
| 5,454,165 | A | * | 10/1995 | Thompson et al. | ............. | 30/340 |
| 5,659,959 | A | * | 8/1997 | Parlowski | ............. | 30/341 |
| 5,671,504 | A | * | 9/1997 | Gou | ............. | 16/430 |

* cited by examiner

Primary Examiner—Hwei-Siu Payer
(74) Attorney, Agent, or Firm—Bachman & LaPointe, P.C.

(57) ABSTRACT

A cutting tool has two active members pivotally mounted around a common transverse axis. The rear portion of each active member has a cross-section of height greater than its width. The corresponding intermediate element is made by being overmolded around the rear portion. The rear portion and the corresponding intermediate element are pierced by at least two through holes for passing respective fasteners such as screws for fixing the corresponding tubular handle in place.

6 Claims, 2 Drawing Sheets

CUTTING TOOL OR THE LIKE, SUCH AS A PAIR OF SECATEURS COMPRISING TOW PIVOTING ACTIVE MEMBERS

BACKGROUND OF THE INVENTION

The present invention relates to a cutting tool or the like such as a pair of pruning shears or "secateurs" comprising two active members such as a blade and an anvil pivotally mounted about a common transverse axis.

Numerous cutting tools or the like of the above-specified type are known, and many such tools have two tubular handles enabling actuator grips to be disposed at a distance from the common transverse axis so as to increase the cutting or clamping force of the tool by means of the lever arm effect.

In particular, a cutting tool or the like of the above-specified type is known in which the rear portion of each active member, i.e. blade or anvil, is surrounded by an intermediate element on which a tubular handle is engaged, means being provided for fixing each tubular handle to the rear portion of the corresponding active element.

In that known tool, the intermediate element is in two portions separated by a longitudinal plane and it is inserted inside the tubular handle, with the rear portion of the corresponding active member being inserted therein by force, said rear portion being substantially conical in shape so as to force the two portions of the intermediate element against the inside walls of the tubular handle.

In that embodiment, which gives entire satisfaction, it is necessary to apply considerable force in order to assemble the tool or to disassemble it in order to replace each active member, i.e. blade or anvil for a pair of secateurs.

SUMMARY OF THE INVENTION

The object of the present invention is to propose a cutting tool or the like of the above-specified type enabling the handle to be mounted and removed easily on the corresponding active member without reducing the reliability of the connection between the handle and the said active member.

The object of the invention is also to lighten the head of the cutting tool or the like beside the active members, by eliminating the two-part active elements.

In accordance with the present invention, in the cutting tool or the like of the above-specified type, the rear portion of each active member has a cross-section of height greater than its width, the corresponding intermediate element is made by being overmolded around said rear portion, and said rear portion and said corresponding intermediate element are pierced by at least two through holes, each for passing a fastener such as a screw for fixing the corresponding tubular handle in place.

Contrary to the teaching of the prior art as recalled above which recommends mounting the intermediate element at a force-fit inside the tubular handle, the present invention uses the fact that by making the intermediate element as an overmolding around the rear portion of each active element while leaving room for at least two through holes to pass respective fasteners such as screws, it is possible to obtain dimensions for the intermediate element that are sufficiently precise and regular to guarantee sufficient clearance to enable the tubular handle to be engaged on the intermediate element, while ensuring that said clearance is not excessive, which would become troublesome and harmful while the tool is in use.

The tubular handle can then be fixed on the intermediate element by at least two fasteners such as screws passing through the tubular handle and the intermediate element.

In a preferred embodiment of the invention, each intermediate element has, on one side of the corresponding rear portion, respective cavities around through hole for receiving respective nuts adapted to cooperate with corresponding screws.

The nuts are thus locked in said cavities when the tubular handle is engaged on the intermediate element and no longer constitute obstacles on the outside of the tubular handle.

It is thus preferable to use screws of length selected to avoid extending beyond the nuts when screwed therein. The tubular handle can thus be pierced by a single hole for passing each screw, the handle being effectively clamped against the intermediate element by tightening the screw, thereby eliminating all slack in transmitting forces between the tubular handle and the corresponding intermediate element.

BRIEF DESCRIPTION OF THE DRAWINGS

Other features and advantages appear from the following detailed description.

In the accompanying drawings, given purely as non-limiting examples.

DETAILED DESCRIPTION OF THE PREFERRED EMBODIMENT(S)

Figure 1:
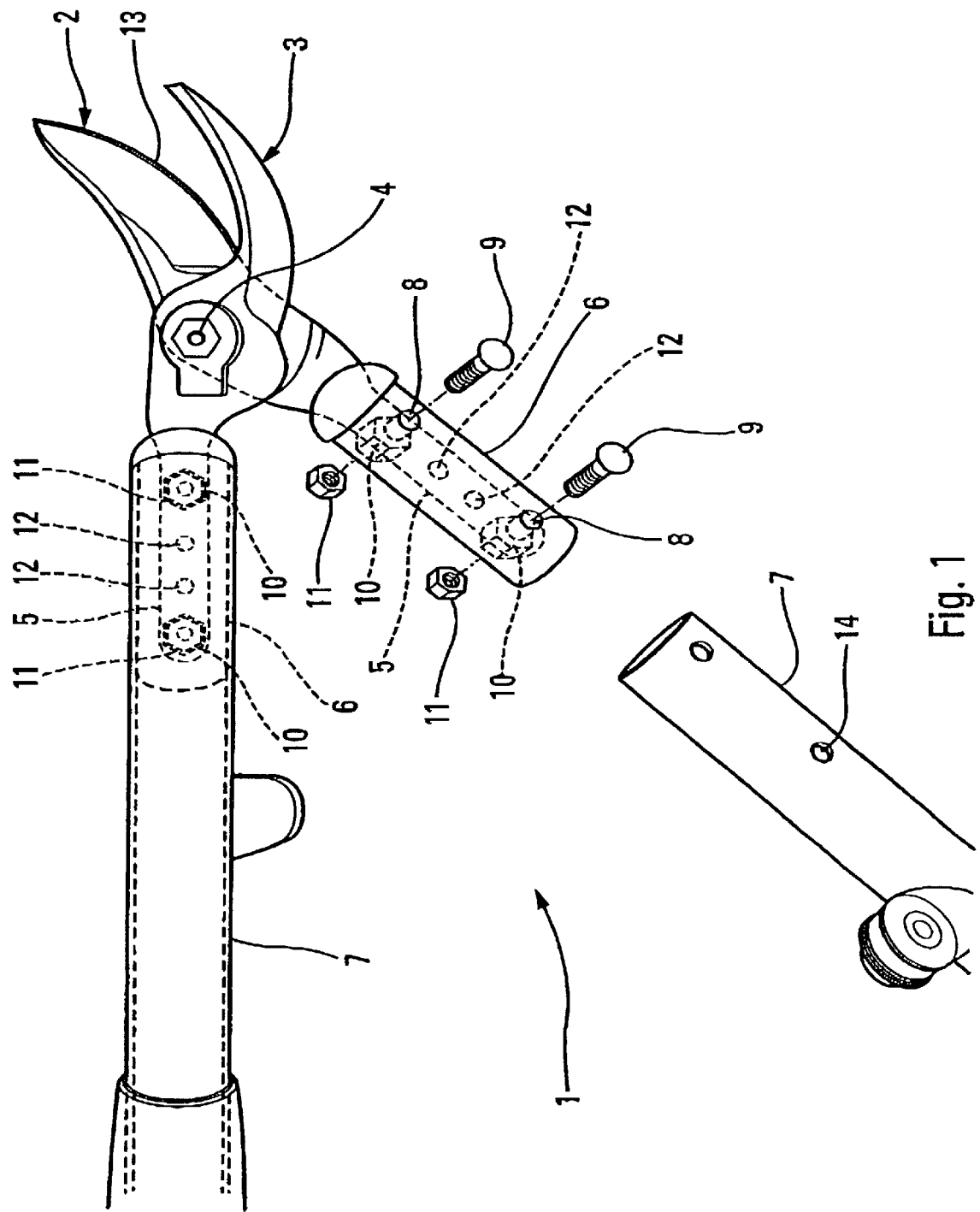
FIG. 1 is a diagrammatic exploded perspective view of an embodiment of a cutting tool or the like in accordance with the present invention.

In the embodiment shown in the figures, the cutting tool 1 is a pair of secateurs 1 comprising two active members, specifically a blade 2 and an anvil 3 which are pivotally mounted about a common transverse axis 4.

The rear portion 5 of each active member 2, 3 is surrounded by an intermediate element 6 onto which a tubular handle 7 is engaged, means being provided for fixing each tubular handle 7 to the rear portion 5 of the corresponding active member 2, 3.

In the present invention, the rear portion 5 of each active member 2, 3 has a cross-section of height H which is greater than its width L. The corresponding intermediate element 6 is made by overmolding plastics material around said rear portion 5. The rear portion 5 and the corresponding intermediate element 6 are pierced by at least two through holes 8, each provided for allowing a fastener 9 such as a screw or a rivet to pass therethrough in order to fix the corresponding tubular handle 7 in place, In the embodiment shown in the figures, each intermediate element 6 has a cavity 10 of hexagonal outline around each through hole 8 and both on the same side of the corresponding rear portion 5, thus enabling a nut 11 to be housed and retained so as to co-operate with a corresponding screw 9.

The tool 1 further comprises means for fixing the intermediate element 6 to the corresponding rear portion 5.

In this example, the rear portion 5 has at least one through hole 12 that remains full of plastics material on overmolding.

The plastics material used for making each intermediate element 6 by overmolding is a conventional plastics material suitable for such an operation.

In particular, this plastics material is selected in such a manner as to make it possible by overmolding to obtain an intermediate element 6 of dimensions that are precise and regular, stable and reliable, so that sufficient clearance is obtained between the intermediate element 6 and the corresponding tubular handle 7 to enable the tubular handle 7 to be engaged easily on the intermediate element 6 without that clearance being excessive so as to impede use of the tool 1.

Figure 2:
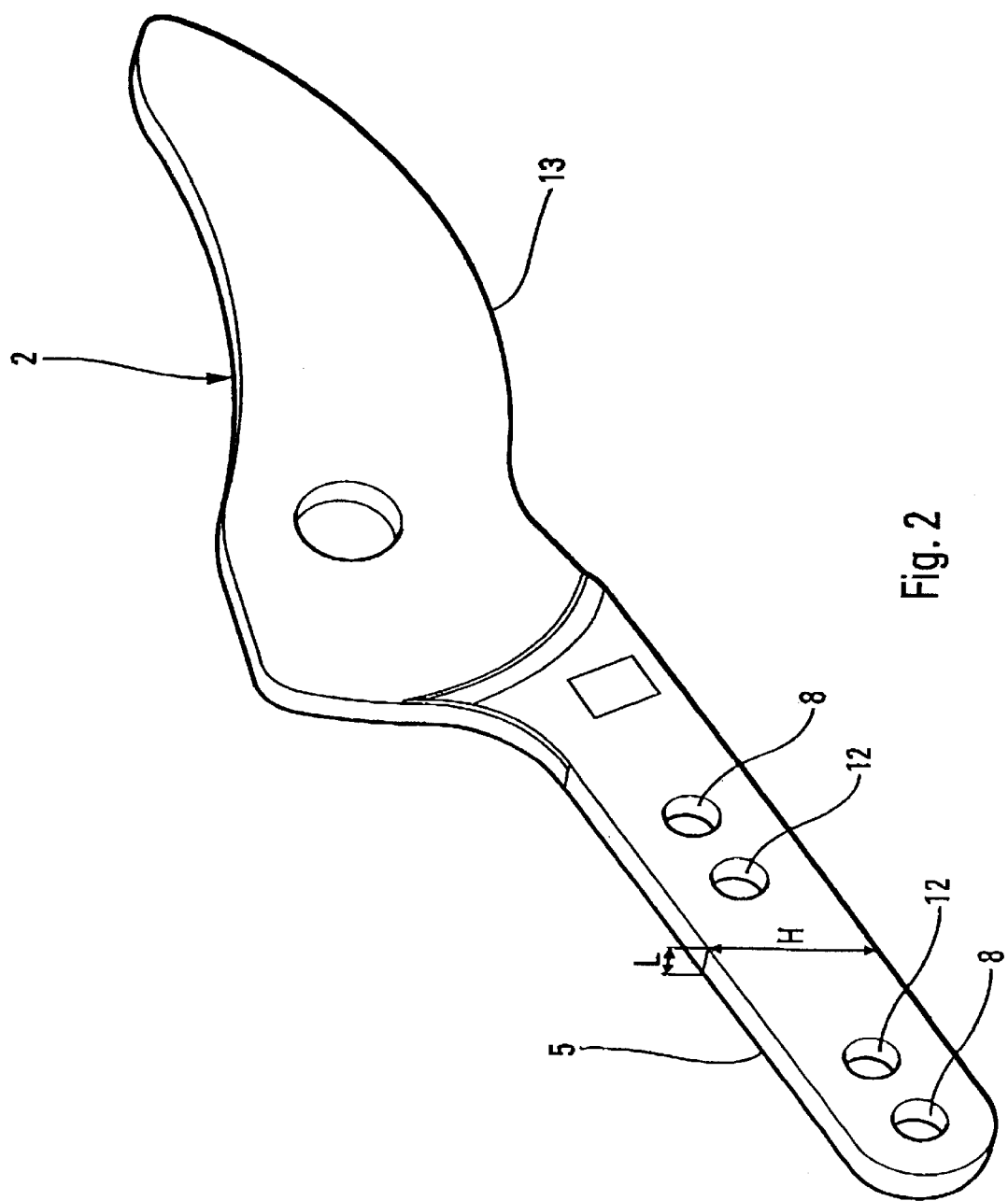
FIG. 2 is a diagrammatic perspective view of one of the active members of the FIG. 1 tool.

In the example shown in FIG. 2, the blade 2 is made from a steel sheet by forming in a press and by grinding its cutting edge 13.

The rear portion 5 of the blade 2 is rectangular.in cross-section which is entirely suitable for ensuring that the intermediate element 6 overmolded on said rear portion is held effectively in place. Nevertheless, this rear portion 5 could have any other appropriate shape.

The rear portion of the anvil 3 is preferably identical to that of the blade 2, although this is not essential.

In conventional manner, each tubular handle 7 is a metal tube, e.g. an aluminum tube, of inside shape that matches the outside shape of the intermediate element 6, and is advantageously round in section.

For each screw 9, each handle 7 is pierced by a single corresponding hole 14 through which the screw 9 inserted and does not come out through the other side of the handle 7.

To make a cutting tool of the present invention, the two active members are made first, e.g. the blade 2 and the anvil 3, each having in its rear portion at least two holes 8 suitable for receiving a respective screw 9 and at least one auxiliary hole 12 suitable for receiving plastics material during overmolding.

For overmolding purposes, each rear portion 5 has a core (not shown) placed thereon so as to leave a cavity 10 suitable for receiving a nut 11 and the corresponding hole 8 through the plastics material of the intermediate element 6.

The plastics material is then overmolded so as to 3form the intermediate element 6. The above-mentioned cores are removed and a nut 11 is inserted into each cavity 10. Thereafter a tubular handle 7 is engaged on the intermediate element 6 and a screw 9 is inserted through each hole 14 of the handle 7 so as to clamp the handle 7 against the intermediate element 6 by tightening the screw 9 in the nut 11.

In the event of the blade 2 or the anvil 3 becoming worn, the screws 9 are undone, the worn blade 2 or anvil 3 is removed, and a new blade 2 or anvil 3 is put into place provided with its own overmolded intermediate element 6, after inserting the nuts 11 into the corresponding cavities 10, and then the tubular handle 7 is engaged and the screws 9 are put into place.

Naturally, the present invention is not limited to the embodiments described above, and numerous changes and modifications can be made thereto without going beyond the ambit of the invention.

What is claimed is:

1. A cutting tool comprising two active members pivotally mounted about a common transverse axis, a rear portion of each said active member being surrounded by an intermediate element on which a tubular handle is engaged, means for fixing each said tubular handle to the rear portion of a corresponding active member, the rear portion of each active member having a cross-section of height greater than its width, each said intermediate element being made by being overmolded around said respective rear portion, and said rear portion and a corresponding intermediate element being pierced by at least two through holes for receiving a fastener for fixing the corresponding tubular handle in place.

2. A tool according to claim 1, wherein each said intermediate element has, on one side of the corresponding rear portion, respective cavities around each said through hole for receiving respective nuts adapted to co-operate with corresponding screws.

3. A tool according to claim 1, including means for fixing the intermediate element to the corresponding rear portion.

4. A tool according to claim 3, wherein each said rear portion has at least one auxiliary through hole adapted to be filled with plastics material during overmolding.

5. A tool according to claim 1, wherein a plastics material used for making the intermediate element by overmolding is selected in such a manner as to obtain an intermediate element having dimensions that are precise and regular.

6. A tool according to claim 1, said tool being a pair of secateurs comprising as active members a blade and an anvil.

* * * * *